3,379,014
SOIL SEALANT COMPOSITIONS AND PROCESSES

Kenneth G. Phillips, Lombard, Theodore R. Schuh, Jr., Broadview, and William J. Ward, Naperville, Ill., assignors to Nalco Chemical Company, Chicago, Ill., a corporation of Delaware
No Drawing. Filed Oct. 26, 1964, Ser. No. 406,552
5 Claims. (Cl. 61—1)

This invention, in general, relates to soil sealant compositions and to processes for treating soil beneath a body of water to decrease the water seepage through the soil.

It has been estimated that one out of every three gallons of irrigation water in irrigation systems employing unlined irrigation canals is lost through seepage into the soil. The loss of water through seepage into the banks of canals and laterals is a significant loss of natural resources. This seepage occasionally renders land surrounding the canals and laterals unusable as a result of flooding. Concrete linings as well as a host of other physical barrier-type linings, such as bituminous asphalt emulsions, plastic memberanes, etc., are used to control seepage losses in canals, ponds, lagoons, and other water bodies. While these materials vary in cost and applicability, all of them require a substantial amount of effort in installation and all require that the canals, etc., be taken out of use during the installation procedure. In most cases, the water is removed during the installation procedure.

None of the above practices are considered to be low in cost, especially in installation cost. This invention proposes an economical process for treating the soil beneath a body of water, e.g., a canal, pond, lagoon, etc., to decrease the water seepage through the soil by the addition of a chemical or chemicals to the water body and forming a water seepage barrier in said soil by migrating thereinto the water containing the chemical or chemicals. The effect of the chemicals in the water as it migrates into the soil is that of sealing the subsoil and preventing or substantially reducing the seepage loss through this subsoil.

A preferred chemical for purposes of the invention is a salt of humic acid. This salt preferably is a water-soluble or colloidally dispersible salt such as an alkali metal salt, ammonium salt or an amine salt of humic acid. In some cases, water-insoluble salts of humic acid, such as the calcium, magnesium, aluminum and iron salts thereof, can be used with success as the soil sealant.

In the most preferred forms of the invention, the soil sealant compositions of the invention comprise a water-soluble salt of humic acid, preferably the alkali metal salt, in combination with an inorganic salt which is water-soluble or water-dispersible and has an anion which forms an insoluble precipitate with hardness elements of water, i.e., calcium and/or magnesium ions.

It is, therefore, a primary object of the invention to provide a process for decreasing the water seepage through subsoil beneath a body of water by forming a water seepage barrier in the subsoil by bringing a salt of humic acid into contact with the subsoil.

Another object of the invention is to provide processes of the aforesaid character by migrating into the subsoil water containing a small amount of a salt of humic acid.

A further object of the invention is to improve the soil treating processes of the aforesaid character by combinations of a water-soluble salt of humic acid and other inorganic salts.

A further object of the invention is to provide soil sealant compositions comprising a salt of humic acid preferably a water-soluble salt thereof, and an inorganic salt having an anion which forms a precipitate with hardness elements.

A still further object of the invention is to provide processes for decreasing the water seepage of subsoil beneath a body of water by migrating into the soil water containing a small amount of a water-soluble salt of humic acid, an alkali metal carbonate, an alkali metal polyphosphate, and composites thereof.

It has been discovered, in accordance with the invention, that salts of humic acid, alkali metal carbonates, alkali metal polyphosphates, and composites thereof, especially the latter, are effective soil sealants for decreasing water seepage through subsoils beneath bodies of water. The subsoils in which these chemicals are effective as soil sealants are those containing polycations such as calcium, magnesium, aluminum, iron, etc. The invention is especially useful where the subsoil consists essentially of clay or an admixture of clay and other soil materials, such as sand, or the like.

The humate salts are the resultant products from reaction of a source of humic acid which is a generic term for acids derived from humus or the top layer of the soil containing organic decomposition products of vegetation, etc., with an organic or inorganic base. Sources of the humic acid may be from peat, brown coal, lignite, and the like. Of course, the invention contemplates the use of salts prepared from raw materials containing varying amounts of humic acid. In fact, it is preferred that the impure or just mined humic material be used as starting reagent, due to low cost, availability, and lack of need for costly subsequent processing prior to salt formation.

One of the sources of humic acid is leonardite, often found in association with lignite. This is a specific organic substance named after A. G. Leonard, who was associated with its discovery. It is considered to be more in the nature of a chemical useful in various additive processes rather than as a fuel, due to its relatively poor combustibility and B.t.u. content per unit weight. Leonardite is primarily mined from the Harmon bed in Bowman County, North Dakota and Divide County, North Dakota, and in an around Alpine, Texas. Although physically similar to lignite, leonardite has a much richer oxygen content that does lignite, ranging in oxygen content from 27–33% by weight, whereas lignite contains about 19–20% oxygen by weight. The high oxygen content of leonardite is ascribed to the presence of carboxylic acid and phenolic groups in the leonardite molecule. Spectral analysis has indicated the leonardite is generically speaking a mixture of humic acids and salts thereof which upon excitation for such analysis, causes certain distinctive spectral patterns to appear. Although not proved conclusively, leonardite is probably a large aryl carboxylic polymeric molecule. The following structural formula has been proposed as a representative-type molecule defining leonardite in the acid form. This formula, of course, is not meant to be conclusive but has been tendered in order to show the complex problems in defining such sources of humic acid as leonardite, and other humic acid-containing materials. Reference to their mining sources is often the most convenient route to precise definition.

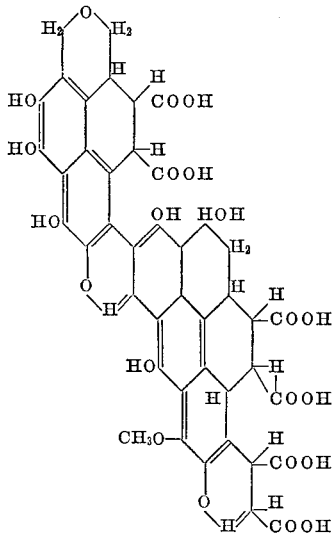

A typical leonardite sample normally said to be comprised of calcium, sodium, magnesium, potassium, etc., salts of complex organic acid and free organic acid is partially analyzed as follows:

| | |
|---|---|
| Ash | 14.01 |
| C | 48.75–53.98 |
| H | 3.79–4.70 |
| N | 1.25 |
| O | 31.99 |
| $CH_3$ | 1.26 |
| $CH_3O$ | 0.44 |
| $CH_3CO$ | 0.38 |

The equivalent weight of the above sample of leonardite was determined to be 256.

Metal salts of humic acid are formed by the reaction of a humus material, such as leonardite with an alkali metal, alkaline earth metal or ammonia. The representative humus material, such as leonardite can be reacted with ammonium hydroxide, alkali metal hydroxide or a carbonate, or an alkaline earth metal hydroxide, e.g., calcium hydroxide, sodium hydroxide or potassium hydroxide to give a salt product which has a pH greater than 7.0 when measured as a 10% dispersion in water. The resultant salt solution can be dried, and the dry product can be granulated or broken into a product in relatively finely divided form. To make the amine salts of humic acid, a wide variety of amines may be employed as reactants, but it is greatly preferred that amines be employed whose reaction products with the humus materials are water-soluble or water-dispersible. For best effectiveness, the amine humate salts must have the ability to be solubilized or at least must have sufficient hydrophilic character to be colloidally dispersed in water. Among those preferred amines are monoamines, and more preferably amines containing at least one hydroxyl group. Amines which have been employed with much success include methyl amine, ethyl amine, diethyl amine, morpholine, butyl amine, isopropylamine, di-isopropylamine, N-methyl morpholine, triethylamine, aminoethyl ethanolamine, diethanolamine, diethyl ethanolamine, di-isopropanolamine, dimethyl ethanolamine, dimethyl isopropanolamine, N-hydroxy ethyl morpholine, N-methyl-diethanolamine, monoethanolamine, monoisopropanolamine, triethanolamine, tri-isopropanolamine, 1,1-dihydroxymethyl ethylamine, 1,1-dihydroxymethyl n-propylamine and polyglycol amines. A preferred species of the last listed amine has a general formula, $$H_2NCH_2CH_3(OCH_2CH_2)_xOH$$

where $x$ may vary from 1 to 10.

The method of preparation of amine humate salts by reaction of the respective salt-forming ingredients may be considerably varied. A representative method is to dissolve the reactants in water, mix thoroughly, and then allow the salts to air dry from the liquid media. The drying step may also be conveniently carried out in drying oven. The mode of addition of reactants to water or to each other is immaterial. For example, the humus material may be first dispersed in water and the amine added thereto. Likewise, an aqueous amine solution may be prepared, to which is added the humic acid material. During the reaction, the basic amine groups react with the carboxylic or phenolic groups existing on the humic acid in order to form salts having the requisite water solubility.

In preparation of the above amine humate salts, it is preferred that from 0.1 to 1.0 equivalents of amine be used for each equivalent of humic acid. The equivalent weight of the particular humic acid material employed is the weight required to react with one mole of sodium hydroxide, depending in turn upon the number of reactive groups available.

If desired, the above salt-forming reaction may be carried out either at room temperature or at elevated temperatures. The amount of time necessary to effect the reaction is quite minimal and usually reaction is considered complete in times varying from 2–60 minutes.

The simplest method for practicing the processes of the invention comprises the addition to a body of water having natural soil seepage of a soil sealant chemical or composition of the invention in a concentration in the body of water sufficent to build up a water seepage barrier in the subsoil as the chemical or composition is carried by the seeping water into the subsoil. The buildup of the water seepage barrier to a point wherein there is a substantial decrease in water seepage may take place in a period of a few hours or over a period of several days or even weeks.

While it is not our intent to be limited thereto, it is theorized that the ammonium, amine or alkali metal salt of humic acid permeates the subsoil and therein base exchanges with polyvalent metal cations in the subsoil, e.g., calcium, magnesium, aluminum, iron, etc. In this base exchange, the humic acid salt is converted to a water-insoluble form which forms a precipitate and thereby blocks or impedes flow of water through the capillary passages of the soil. In this manner, the capillary passages of the soil become progressively more resistant to water flow therethrough as the build-up of the water-insoluble salt of humic acid progresses.

Based on the above, it is apparent that the best type of soil upon which the invention can be practiced is a soil containing base exchangeable polyvalent metal cations of the aforesaid character. Virtually all soils, except essentially pure sand, contain such base exchangeable polyvalent metal cations. Soils which are essentially clay or clay-containing soils, including sandy clays, can be treated with success in accordance with the invention.

If the subsoils are low in base exchangeable polyvalent metal cations, e.g., pure sand or the like, the treatment with the salt of humic acid may be conducted with a water-insoluble salt such as calcium or magnesium humate. The insoluble salt is carried into the subsoil by the seeping water where it becomes entrapped and thereby aids in blocking off the passages. The water-insoluble salts of humic acid are voluminous precipitates.

In addition to the humate salts, certain inorganic salts have also proven to be useful with some success as soil sealants. These inorganic solids include alkali metal carbonates such as sodium carbonate and alkali metal polyphosphates such as sodium or potassium tripolyphosphate, sodium or potassium hexametaphosphate, and tetrasodium pyrophosphate. These salts have anions which form insoluble precipitates with polyvalent metal cations such as calcium and in some cases iron and aluminum which aid in blocking of the capillary passages of the subsoil upon their precipitation as solutions of these salts permeate the subsoil.

The most preferred soil sealants of the invention comprise one of the aforesaid water-soluble or water-dispersible humate salts and one of the aforesaid inorganic salts, i.e., an alkali metal carbonate or an alkali metal polyphosphate. The benefits obtained by the use of such compositions are two-fold. First, the inorganic salt precipitates hardness elements naturally occurring in the body of water so that the water-soluble humate salt is not prematurely precipitated before it permeates the subsoil. Secondly, the insoluble precipitate formed from calcium or magnesium and the anion of the inorganic salt, either in the water or in the subsoil, aids in the soil sealing action.

Accordingly, a soil sealant composition useful for treating bodies of liquid to decrease water seepage through subsoil beneath the body of liquid comprises a dry mixture of dry finely divided alkali metal carbonate or alkali metal polyphosphate and a dry finely divided water-soluble salt of humic acid in relative weight proportions of 3:1 to 1:3. The composition, in this form, may be added to the body of water to provide therein a concentration of at least 25 p.p.m. of the water-soluble salt of humic acid and at least 25 p.p.m. of the alkali metal carbonate or alkali metal polyphosphate. The upper limit in concentration of the aforesaid compounds is dictated solely by economic considerations, the nature of the subsoil, and the like.

In essentially static systems such as ponds or lagoons, the quantity of the soil treating compositions can be stated in weight units per unit area of the subsoil beneath the body of water. In the latter case, the amount of the water-soluble salt of humic acid should be at least about two grams per square foot and the amount of the alkali metal carbonate or alkali metal polyphosphate should be at least about four to five grams per square foot.

The concentration of the water-soluble humate salt, when used alone, should be at least about fifty p.p.m. The concentrations for water-insoluble humate salts such as magnesium or calcium humate when used alone should be at least about 250 p.p.m. Alkali metal carbonate and alkali metal polyphosphates, when used alone, should have a concentration of at least about 100–150 p.p.m For combinations of the humic acid salt and alkali metal carbonate or alkali metal polyphosphate, the total concentration of the two chemicals of the combination should be at least fifty p.p.m.

To show the effectiveness of the soil sealants of the invention, seepage tests were conducted in Lucite tubing having a 2″ internal diameter and a 24″ height. A 100 mesh screen was held in the bottom of the tube with a rubber stopper having a 13 mm. glass tube drain. The screen is covered with ½″ of coarse Ottawa sand followed by 2″ of dry soil over the sand. This soil is weighted down and vibrated until the water drains out. An additional 4 inches of soil is then added as a slurry. The soil employed is a standardized soil, soil 29B–13, obtained from the Bureau of Reclamation, U.S. Department of the Interior, Denver, Colo.

A constant head of water above the soil bed in the tube of about 12 inches is maintained in the tube. The water has added thereto measured concentrations of the soil treated chemical or composition under test. The water flowing through the soil specimen is measured at defined intervals.

The tests reported in the following table were each conducted for a period of one week. The total quantity of water flowing through the soil specimen for the one week period was compared against the total quantity of water flowing through a soil specimen to which no soil sealant chemical is added. The decrease in total water flow over the one week period, using the total water flow through the last mentioned specimen as the base, is reported in percent effectiveness.

Results of tests conducted in accordance with the foregoing procedure with soil sealant chemicals and soil sealant compositions are reported in the following table. The concentrations in p.p.m. were concentrations for the water in the tube to the 12 inch level when the tests began. Any subsequent water supplied to the tube and thereafter flowing through the soil samples was fresh water (no additive).

TABLE

| | Soil Sealant | Conc., p.p.m. | Effectiveness, percent |
|---|---|---|---|
| 1 | Sodium humate | 500 | 81.1 |
| | do | 1,000 | 86.4 |
| | do | 2,000 | 91.9 |
| 2 | Sodium humate plus sodium tripolyphosphate | 500+500 | 96.6 |
| 3 | Magnesium humate | 1,000 | 73.8 |
| 4 | Calcium humate | 1,000 | 78.0 |
| 5 | Sodium humate plus sodium carbonate | 500+500 | 94.0 |
| 6 | Sodium humate plus sodium hexametaphosphate | 500+500 | 97.1 |
| 7 | Sodium carbonate | 1,000 | 88.0 |
| 8 | Sodium hexametaphosphate | 1,000 | 87.6 |
| 9 | Sodium tripolyphosphate | 1,000 | 96.5 |
| 10 | Sodium carbonate plus sodium tripolyphosphate | 500+500 | 77.0 |

It will be noted from the above table that the most effective soil sealants were compositions comprising the alkali metal humate salt and the alkali metal carbonate or polyphosphate. It is further interesting to note that the use of a composition comprising sodium carbonate and sodium tripolyphosphate was substantially less effective than the individual components thereof at total concentrations in each case of 1,000 p.p.m. On the other hand, treatment with the alkali metal humate plus the alkali metal carbonate or polyphosphate was, in general, more effective than the individual components thereof at total concentrations in each case of 1,000 p.p.m.

In a similar test on a deep soil sample provided in the tube, soil was removed in one inch increments after the additive-treated water had passed through the soil sample. Some effectiveness in blocking water flow was observed as deep as 22 inches in the soil sample. This indicates a soil-sealant function extending from the upper soil level to a substantial depth into the subsoil.

The following are examples of specific embodiments of the compositions of the invention useful for the addition to water as subsoil sealant materials.

Example I

Percent by weight
Sodium humate _____ 50
Sodium carbonate _____ 50

Example II

Sodium humate _____ 60
Sodium hexametaphosphate _____ 40

Example III

Sodium humate _____ 50
Sodium tripolyphosphate _____ 50

Example IV

Calcium humate _____ 100

Example V

Sodium humate _____ 100

The invention is hereby claimed as follows:

1. A process for treating soil beneath a body of surface water to decrease the water seepage through said soil, which process comprises providing in said body of surface water a concentration of at least 25 p.p.m. of a water soluble salt of humic acid obtained from a member of the class consisting of peat, brown coal, lignite and leonardite and of at least 25 p.p.m. of a water soluble inorganic salt selected from the group consisting of alkali metal carbonate and alkali metal polyphosphate at a weight ratio of the humic acid salt to said inorganic salt of 3:1 to 1:3, and, upon seepage of said water into said soil therebeneath, decreasing the water permeability and, hence, the seepage through said soil by base exchange of the cations of said salts with base exchangeable polyvalent metal cations of said soil.

2. A process as claimed in claim 1, wherein said water soluble inorganic salt is sodium carbonate.

3. A process as claimed in claim 1, wherein said water soluble inorganic salt is a sodium polyphosphate.

4. A process as claimed in claim 1, wherein said soil is a clay-containing soil.

5. A process as claimed in claim 1 wherein said weight ratio is about 1:1 and said water soluble salt of humic acid the sodium salt.

References Cited

UNITED STATES PATENTS

| | | | |
|---|---|---|---|
| 2,916,853 | 12/1959 | Latourette et al. | 106—287 |
| 3,124,934 | 3/1964 | Glenn et al. | 61—36 |
| 3,252,290 | 5/1966 | Gagle et al. | 61—36 |

FOREIGN PATENTS

| | | |
|---|---|---|
| 701,816 | 1/1954 | Great Britain. |

OTHER REFERENCES

Dean, K. C., and L. M. Greene: U.S. Dept. of Interior, Bureau of Mines, Field and Laboratory Studies of canal lining materials, Riverton Project. Preliminary Report 123 (February 1959).

Lambe, T. Wm.: The Improvement of Soil Properties with Dispersants, Journal of Boston Society of Civil Engineers 41, 2, 184–207 (April 1954).

JACOB SHAPIRO, *Primary Examiner.*

DAVID J. WILLIAMOWSKY, *Examiner.*